Aug. 26, 1930.    U. A. WHITAKER    1,774,162
LOAD BRAKE DEVICE
Filed April 19, 1928
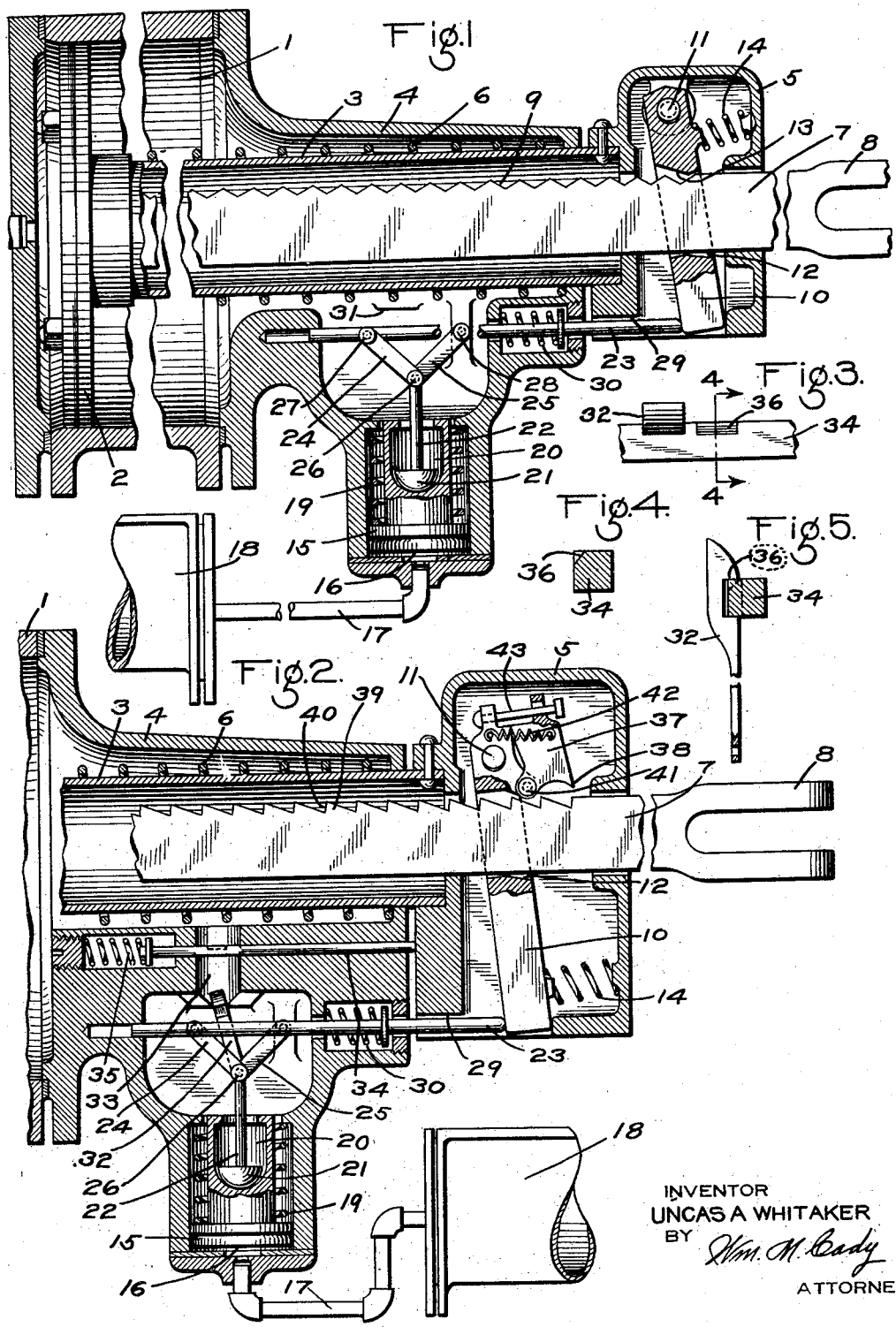
INVENTOR
UNCAS A WHITAKER
BY
Wm. M. Cady
ATTORNEY Patented Aug. 26, 1930

1,774,162

UNITED STATES PATENT OFFICE

UNCAS A. WHITAKER, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

LOAD-BRAKE DEVICE

Application filed April 19, 1928. Serial No. 271,194.

This invention relates to fluid pressure brakes, and more particularly to a brake apparatus adapted to be adjusted for empty and loaded car braking and commonly known as empty and load brake equipment.

In this type of brake apparatus, two brake cylinders are provided, one for empty car braking (the empty cylinder) and both (the empty and load cylinder) for loaded car braking. In loaded car braking, the empty cylinder is first supplied with fluid under pressure for taking up slack and applying the brakes, and then fluid under pressure is supplied to the load cylinder. As the push rods of both cylinders are connected to the brake rigging, means is provided for allowing movement of the push rod of the load cylinder with the rigging to take up slack independent of the load cylinder piston and crosshead and then for connecting the push rod with the load brake piston for unitary movement upon the bringing of the load cylinder into action.

An object of my invention is to generally improve the clutching mechanism employed for connecting the load cylinder push rod with the load cylinder piston and crosshead and to provide novel means for bringing the clutch mechanism into and out of operative position by fluid under pressure supplied from the empty cylinder.

Another object of the invention is to provide means for delivering a hammer blow to the latch member of the clutch mechanism to insure the proper release thereof.

A further object of the invention is to provide a clutch mechanism that will engage the push rod with the smallest possible movement of the load cylinder crosshead.

Other objects and advantages will appear in the following more detailed description of the invention.

In the accompanying drawing; Fig. 1 is a fragmentary longitudinal section through a load brake cylinder embodying my invention; Fig. 2 is a similar view showing another form of my invention; Fig. 3 is a detail view in plan showing a locking device for the plunger rod of the clutch mechanism; Fig. 4 is a transverse section through the release rod taken on the line 4—4 of Figure 3 looking in the direction of the arrows; and Fig. 5 is a side elevation of the locking device showing the same engaging the release rod, the rod being in section.

Referring to the form of my invention shown in Figure 1 of the drawing, the device includes a load cylinder 1 having slidably mounted therein the piston 2 to which is connected the hollow piston rod 3. The forward end of the piston rod 3 extends exteriorly of the non-pressure head 4 of the cylinder 1 and has connected therewith a hollow crosshead 5. The piston rod 3 and crosshead 5 are normally maintained in their inward brake release position by means of an expansion coil spring 6. Slidably mounted within the hollow piston rod 3 is a push rod 7 and this rod 7 extends through the crosshead 5 and is in turn provided with a head 8 for connection with the conventional brake rigging (not shown). One edge of the push rod is notched as at 9.

As stated, the invention resides more particularly in the clutch mechanism employed for connecting the push rod 7 with the piston rod 3 and this mechanism may include a latch 10 contained within the hollow crosshead 5. The latch 10 is rockably mounted at its upper end on a suitable pivot pin 11 carried by the crosshead 5 and is provided with a slot 12, through which extends the push rod 7. A tooth 13 is formed on the upper wall of the slot and the tooth is adapted to lock with an adjacent notch 9 of the push rod 7, when the latch 10 is in one of its positions. A coil spring 14 may be provided for normally urging the latch 10 to its locking position.

In accordance with this invention, a piston 15 is mounted in a piston chamber 16 formed in the non-pressure head 4 and this chamber 16 has communicating therewith below the piston 15, a pipe 17, through which fluid under pressure is supplied from the empty cylinder 18, as will be more fully described. This piston is normally maintained in its lowered position by a spring 19 and the piston is provided with a pocket 20, in which is received the semi-spherical head 21 of a rod 22. This rod 22 is allowed longitudinal as well as rocking movement relative to the piston and extends into the non-pressure head 4 beyond the piston 15 and chamber 16.

A plunger rod 23 is slidably carried by the non-pressure head 4 above the piston 15 and rod 22 and is connected with the rod 22 by a suitable toggle, which includes toggle levers 24 and 25. The toggle levers 24 and 25 are pivotally connected together at their lower ends and to the rod 22 by a suitable pivot pin 26. The lever 24 has its upper end connected, by means of a pivot pin 27, to the plunger rod 23, while the lever 25 has its upper end connected, by a pivot pin 28, to a suitable portion of the non-pressure head 4. By this arrangement, when fluid under pressure is admitted to the piston chamber 16, the piston will be raised, causing the straightening of the toggle and the consequent inward movement of the plunger rod 23, out of the hollow crosshead 5 and away from the latch 10. It being noted, that the crosshead 5 is provided with a suitable guide 29 for receiving the forward end of the plunger rod. An expansion coil spring 30, is placed about the plunger rod and normally tends to move the plunger rod out against the lower end of the latch 10 for swinging the latch on its pivot and the tooth 13 from out of locking engagement with the notches 9 of the push rod 7. A lug 31 may be formed on the non-pressure head in the path of the toggle for limiting the upward swinging movement thereof.

The parts of the device are normally positioned, as shown in Figure 1 of the drawing, and when the apparatus is set for load braking, upon effecting an application of the brakes, fluid under pressure is first supplied to the empty brake cylinder 18 and the push rod 7 is pulled out in the usual manner through its connection with the brake rigging. When fluid pressure in the empty cylinder has built up to a predetermined value, which will be made less than the setting of the transfer valve (not shown) or prior to operation of this valve device to supply fluid under pressure to the load cylinder 1, the pressure of fluid in the chamber 16, will become sufficient to overcome the tension of the springs 19 and 30 and force the piston 15 up in its chamber. This will cause the straightening of the toggle levers 24 and 25, which in turn, will withdraw the plunger rod 23 away from the pivoted latch 10. This will allow latch 10, under influence of its spring 14, to engage an adjacent notch 9 of the push rod and thus lock the push rod 7 and crosshead 5 together for unitary movement, upon operation of load cylinder piston 2.

The mechanism will then remain in this position until the brakes are released, and when the fluid under pressure is reduced in the empty cylinder, to some predetermined pressure less than that required to cause the load cylinder to release, the tension of the spring 19 will force the piston 15 down. Due to the lost motion between piston 15 and rod 22, the piston will move down part way without moving the rod. After the piston has moved the distance between the head 21 and the upper end of the piston, the piston will pull down on the rod and swing the pivot 26 of the toggle below the rod 23. This permits spring 30 to force plunger rod 23 forcibly out in engagement with the latch 10 to swing the same on its pivot out of locking engagement with the push rod 7.

In Figures 2 to 5 inclusive, another form of the invention is shown, in which means is provided for insuring that the plunger rod 23 will not be forced out until the load cylinder piston is in fully released position, so as to insure the plunger rod will strike the latch 10 a hammer blow and so make the disengagement of the latch more positive. The latch being also modified to permit the same to more easily disengage from the push rod 7.

In this connection, a resilient latch 32 is connected to the pivot pin 26 of the toggle levers 24 and 25 and extends upwardly therefrom into a well 33 formed in the non-pressure head 4. A release rod 34 is slidably carried by the non-pressure head and extends diametrically through the well 33 and out of the non-pressure head 4. An expansion spring 35 is provided for normally urging the release rod 34 outward of the head 4 and into the path of the piston rod crosshead 5. This release rod 34 is provided with a flat upper face, and when the piston 15 is raised by fluid under pressure supplied from the empty cylinder, the resilient latch will be raised therewith and the upper end thereof will hook over the release rod 34, as shown, in Figures 3 and 5. Upon release of fluid under pressure from the chamber 16, the piston 15 will lower under influence of its spring 19, but the rod 22 and the toggle levers 24 and 25 will be held against movement due to the resilient latch 32. This is permitted, due to the lost motion between the piston 15 and rod 22. When the load cylinder is entirely released, the crosshead 5 will push the release rod 34 inward and when the beveled face 36 formed on the release rod 34 moves into alignment with the hooked end of the resilient latch 32, the resilient latch will flex and be pulled downward under influence of the plunger rod spring 30. The release of the resilient latch 32 will permit quick operation of the spring 30 and thus the delivering of a hammer blow by the plunger rod 23 to the latch 10, causing the swinging thereof on its pivot to a positive release position.

To render the latch easily disengageable from the push rod 7, the latch 10 at its upper end is provided with a pawl 37 having a tooth 38 for engaging the notched push rod 7, it being noted that the push rod 7 in this instance is provided with teeth 39 having abrupt substantial vertical faces 40. The pawl 37 is pivoted at its lower inner end, as at 41, to the latch 10 below the pivot 11 thereof and the pawl is normally held against swinging movement by a spring 42.

When the latch is in its locked position relative to the push rod, the pawl 37 will have a tendency to wedge tighter in place as the crosshead moves out, because of the angularity of the line through fulcrum with respect to the normal pivot point of the tooth. However, when the latch is swung on its pivot by the plunger rod 23, the pivot of the pawl will be raised relative to the pivot 11 of the latch 10, causing the pawl to swing in on its pivot out of engagement with the push rod. A guide rod 43 is provided for limiting the swinging movement of the pawl.

From the foregoing, it can be seen that the latch is positively operated and will be moved to its operative locking position with the smallest possible movement of the load cylinder crosshead.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake cylinder having a piston rod and a push rod, of a clutch device for operatively connecting the push rod to the piston rod, and fluid pressure means for controlling the operation of said clutch device.

2. In a fluid pressure brake, the combination with a brake cylinder having a piston rod and a push rod, of a clutch device for operatively connecting the push rod to the piston rod including a gripping member, and means operated by fluid under pressure for moving the gripping member to an inoperative position.

3. In a fluid pressure brake, the combination with a brake cylinder having a hollow piston rod and a push rod mounted in said piston rod, of a clutch device for operatively connecting said push rod to the piston rod including a gripping member, means normally tending to move the gripping member to a locking position, and fluid pressure means for moving the gripping member to an inoperative non-locking position.

4. In a fluid pressure brake, the combination with a brake cylinder having a hollow piston rod and a push rod mounted in said piston rod, of a clutch device for operatively connecting said push rod to the piston rod including a gripping member, means normally holding the gripping member in a released position, means normally tending to move the gripping member to a locked position, and fluid pressure means for operating said first mentioned means.

5. In a fluid pressure brake, the combination with a brake cylinder having a hollow piston rod and a push rod mounted in said piston rod, of a clutch device for operatively connecting said push rod to the piston rod including a swinging gripping member, means normally tending to move the gripping member to a locking position, a plunger rod, and fluid pressure means for moving the plunger rod out of the path of said gripping member.

6. In an empty and load fluid pressure brake, the combination with an empty brake cylinder, and a load cylinder having a piston rod and a push rod movable relative to the piston rod, of a clutch device for operatively connecting the push rod to the piston rod including a gripping member, and fluid pressure means controlled by variation of pressure in said empty cylinder for controlling the operation of said gripping member.

7. In an empty and load fluid pressure brake, the combination with an empty brake cylinder, and a load cylinder having a piston rod and a push rod movable relative to the piston rod, of a clutch device for operatively connecting the push rod to the piston rod including a swinging gripping member, spring means normally tending to move the gripping member to a locking position, means normally arranged in the path of said gripping member for holding the gripping member in a release position against the tension of said spring means, and fluid pressure means controlled by fluid under pressure supplied from said empty cylinder for moving said second mentioned means out of the path of the gripping member.

8. In a fluid pressure brake, the combination with a brake cylinder having a hollow piston rod provided with a hollow crosshead, and a push rod mounted in the piston rod and crosshead and extending exteriorly of the crosshead, of a clutch device for operatively connecting said push rod to the cross head including a gripping member rockably mounted in the crosshead, spring means normally tending to move the gripping member to a locking position, a spring pressed plunger rod normally disposed in the path of the gripping member for holding the gripping member in a released position against the tension of said spring means, and fluid pressure means for moving the plunger rod out of the path of said gripping member.

9. In a fluid pressure brake, the combination with a brake cylinder having a non-pressure head, a hollow piston rod, and a push rod mounted in the piston rod, of a clutch device for operatively connecting said push rod to the piston rod including a swinging gripping member, spring means normally tending to move the gripping member to a locking position, a spring pressed plunger rod normally disposed in the path of the gripping member for holding the gripping member in a released position against the tension of said spring means, the non-pressure head having a piston chamber, a piston in said chamber affected by fluid under pressure, and a toggle connection between the piston and plunger rod having the levers thereof pivoted respectively to the plunger rod and the non-pressure head.

10. In a fluid pressure brake, the combination with a brake cylinder having a non-pressure head, a hollow piston rod, and a push rod mounted in the piston rod, of a clutch device for operatively connecting said push rod to the piston rod including a swinging gripping member, spring means normally tending to move the gripping member to a locking position, a spring pressed plunger rod normally disposed in the path of the gripping member for holding the gripping member in a released position against the tension of said spring means, the non-pressure head having a piston chamber, a piston in said chamber affected by fluid under pressure, a piston rod slidably and rockably carried by the piston, a pair of toggle levers pivotally connected together and to the piston rod, means pivotally connecting one lever to the non-pressure head, and means pivotally connecting the other lever to the plunger rod.

11. In a fluid pressure brake, the combination with a brake cylinder having a non-pressure head, a hollow piston rod, and a push rod mounted in the piston rod, of a clutch device for operatively connecting said push rod to the piston rod including a swinging gripping member, spring means normally tending to move the gripping member to a locking position, a spring pressed plunger rod normally disposed in the path of the gripping member for holding the gripping member in a released position against the tension of said spring means, the non-pressure head having a piston chamber, a piston in said chamber, means normally holding the piston in a lowered position, fluid pressure means for raising the piston, a piston rod slidably and rockably carried by the piston, and a toggle connection between the piston rod, plunger rod and non-pressure head.

12. In an empty and load fluid pressure brake, the combination with an empty brake cylinder and a load cylinder having a piston rod and a push rod movable relative to the piston rod, of a clutch device for operatively connecting the push rod to the piston rod including a swinging gripping member, spring means normally tending to move the gripping member to a locking position, a plunger rod, fluid pressure means controlled by fluid under pressure supplied from said empty cylinder for moving the plunger rod to an inoperative position out of the path of the gripping member, spring means for normally urging the plunger rod into the path of the swinging gripping member, and means releasable upon the full release of the load brake cylinder for holding the rod against movement under influence of said spring means.

13. In an empty and load fluid pressure brake, the combination with an empty brake cylinder and a load cylinder, having a piston rod and a push rod movable relative to the piston rod, of a clutch device for operatively connecting the push rod to the piston rod including a swinging gripping member, spring means normally tending to move the gripping member to a locking position, a plunger rod, fluid pressure means controlled by fluid under pressure supplied from said empty cylinder for moving the plunger rod to an inoperative position out of the path of the gripping member, spring means for normally urging the plunger rod into the path of the swinging gripping member, a latch for holding the plunger rod against movement under influence of said spring means, and a release rod for the latch operable upon full release of the load cylinder.

14. In an empty and load fluid pressure brake, the combination with an empty brake cylinder and a load cylinder having a non-pressure head, a hollow piston rod having a hollow crosshead movable therewith, and a push rod slidably mounted in the piston rod extending exteriorly of the crosshead, of a clutch device for operatively connecting the push rod with the crosshead including a gripping member rockably mounted in the crosshead, spring means normally tending to move the gripping member to a locking position, a plunger rod slidably carried by the non-pressure head, the non-pressure head having a piston chamber therein, a piston in said chamber, spring means normally holding the piston in a lowered position, a piston rod slidably and rockably carried by the piston, means for supplying fluid under pressure from said empty cylinder to the piston chamber for raising the piston, a toggle connection between the piston rod, plunger rod and non-pressure head, a latch for holding the toggle connection against movement upon release of pressure from the chamber, and a release rod for the latch slidably carried by the non-pressure head and normally disposed in the path of the crosshead.

15. In an empty and load fluid pressure brake, the combination with a load cylinder, a piston rod, and a push rod movable relative to the piston rod, of a clutch device for operatively connecting the push rod to the piston rod including a swinging gripping member, spring means normally tending to move the gripping member to a locking position, means normally arranged in the path of said gripping member for holding the same in a release position against the tension of said spring means, fluid pressure means for moving the second mentioned means out of the path of the gripping member, said gripping member including a pawl having a tooth at its outer lower end and pivotally connected to the member at its lower inner end, and spring means normally holding the pawl against movement.

16. In a fluid pressure brake, the combination with a load brake cylinder having a piston therein and a push rod operable by said piston, of an empty brake cylinder, a clutch device for operatively connecting said piston to said push rod, and means operated by fluid under pressure supplied from said empty brake cylinder for operating said clutch device.

17. In an empty and load fluid pressure brake, the combination with a load brake cylinder, a piston therein, and a push rod operable by said piston, of an empty brake cylinder, a clutch device for operatively connecting said piston to said push rod including a swinging gripping member, spring means normally tending to move the gripping member to a locked position, a spring pressed plunger rod normally disposed in the path of the gripping member for holding the gripping member in a released position against the tension of said spring means, and means operated by fluid under pressure supplied from said empty brake cylinder for operating said plunger rod.

18. In an empty and load fluid pressure brake, the combination with a load brake cylinder, a piston therein, and a notched push rod operable by said piston, of an empty brake cylinder, a clutch device for operatively connecting said piston to said push rod including a swinging gripping member having a tooth for engaging the notched push rod, spring means normally tending to move the gripping member to a locking position with the tooth in engagement with the notched push rod, a sliding plunger rod, means operated by fluid under pressure supplied from the empty brake cylinder for moving the plunger rod out of the path of the gripping member and for holding the plunger rod against movement, spring means normally tending to move the plunger rod forcibly in engagement with the gripping member to release said member from locking engagement with the push rod, and spring means operable upon release of fluid under pressure from the empty brake cylinder for operating said first mentioned means to release the plunger rod.

In testimony whereof I have hereunto set my hand.

UNCAS A. WHITAKER.